No. 843,399. PATENTED FEB. 5, 1907.
T. J. KING.
WEEDING AND CULTIVATING DEVICE.
APPLICATION FILED NOV. 17, 1906.
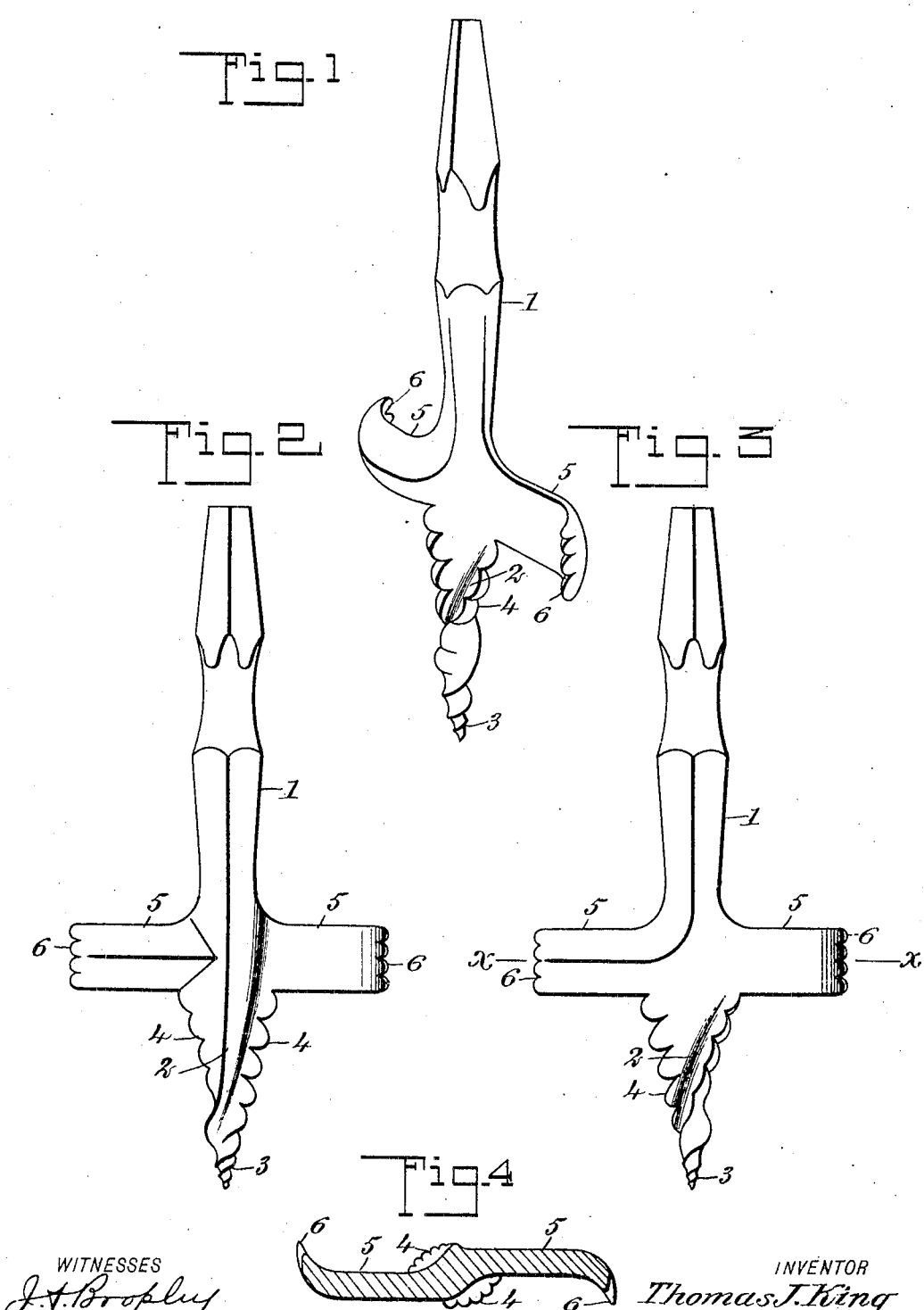

UNITED STATES PATENT OFFICE.

THOMAS J. KING, OF NEW YORK, N. Y.

WEEDING AND CULTIVATING DEVICE.

No. 843,399.  Specification of Letters Patent.  Patented Feb. 5, 1907.

Application filed November 17, 1906. Serial No. 343,840.

*To all whom it may concern:*

Be it known that I, THOMAS J. KING, a citizen of the United States, and a resident of the city of New York, borough of Brooklyn, in the county of Kings and State of New York, have invented a new and Improved Weeding and Cultivating Device, of which the following is a full, clear, and exact description.

This invention relates to improvements in devices for extracting weeds, plants, and the like from the ground, the object being to provide a device of this character by means of which weeds or the like may be readily drawn from the ground with but little manual exertion.

I will describe a weeding device embodying my invention and then point out the novel features in the appended claims.

Reference is to be had to the accompanying drawings, forming a part of this specification, in which similar characters of reference indicate corresponding parts in all the figures.

Figure 1 is a perspective view of a weeding device embodying my invention. Fig. 2 is a side view thereof. Fig. 3 is a side view reverse to that of Fig. 2, and Fig. 4 is a section on the line $x\,x$ of Fig. 3.

Referring to the drawings, 1 designates the shank of the device, which may be of any desired length, that is to be connected to an ordinary bit-brace or to an auger-handle, so that a person operating the device may stand upright. At the lower portion the device has a nib or bit 2, which has a longitudinal spiral trend and is tapered from its upper portion downward, terminating in a screw 3, and the edges of the nib or bit are provided with teeth 4, extended in reverse directions, designed to engage with roots of the weeds or plants. At the upper portion of the nib or bit are laterally-extended wings 5, the end of one wing being curved in an opposite direction to the end of the other wing, and these curved ends are provided with teeth 6.

In operation the device is to be inserted in the ground at the side or top of the weed or plant and forced into the ground by rotary movement. During this rotary movement the nib or bit will entangle the roots, while the wings having the curved ends will entangle the upper portion of the weed. Then by drawing the device outward the weed will be readily removed.

Having thus described my invention, I claim as new and desire to secure by Letters Patent—

1. A device for the purpose described, comprising a shank, a tapered bit portion extended downward from the shank, and laterally-extended wings having curved ends, the curve of one wing being opposite to the curve of the other wing and the ends thereof being provided with teeth.

2. A device for the purpose specified, comprising a shank portion, a tapered bit having a longitudinal spiral trend, the edges of said bit being toothed, and laterally-extended curved wings toothed at the ends.

3. A device for the purpose specified, comprising a shank portion, a tapered bit, the said bit having a longitudinal spiral trend and terminating in a screw-point, the edges of the bit being provided with teeth, lateral wings having reverse curved ends, and teeth formed on said curved ends.

In testimony whereof I have signed my name to this specification in the presence of two subscribing witnesses.

THOMAS J. KING.

Witnesses:
JNO. M. RITTER,
C. R. FERGUSON.